United States Patent

Low et al.

[15] 3,659,292
[45] Apr. 25, 1972

[54] BINARY CODED SEQUENTIAL ACQUISITION RANGING SYSTEM

[72] Inventors: George M. Low, Acting Administrator of the National Aeronautics and Space Administration in respect to an invention of; Warren L. Martin, 4172 Forest Hill Drive; Richard M. Goldstein, 5534 Rock Castle Drive, both of La Canada, Calif. 91011

[22] Filed: Aug. 13, 1970

[21] Appl. No.: 63,532

[52] U.S. Cl. ............................. 343/6.5 R, 343/12 R, 343/14
[51] Int. Cl. ........................................ G01s 9/24, G01s 9/58
[58] Field of Search ......................... 343/6.5, 6.5 LC, 12, 14

[56] References Cited

UNITED STATES PATENTS 3,447,155  5/1969  Webb ................................ 343/13 R
3,530,470  9/1970  Sheftelman et al. ............. 343/6.5 LC Primary Examiner—Malcolm F. Hubler
Attorney—J. H. Warden, Paul F. McCaul and John R. Manning

[57] ABSTRACT

A binary coded sequential acquisition ranging system for determining the distance of very distant objects, such as extraterrestrial probes, is disclosed. A ground transmitter essentially including a phase modulator and a digital coder is employed to sequentially transmit a plurality of code components to a probe transponder for retransmission to a ground ranging circuit which serves to compare the returned code components with locally generated doppler-compensated reference code components. The ranging circuit includes a receiver digital coder, that is a counterpart of the transmitter digital coder, and an adder circuit which serves to effectively doppler compensate the receiver digital coder in accordance with detached doppler shift frequencies to provide the reference code components. A ranging receiver is employed to detect the relative phase difference between reference code components and returned code components. The detected relative phase difference is directly proportional to the range of the distant target and thereby provides a basis for the accurate calculation of range.

11 Claims, 7 Drawing Figures

INVENTORS.
WARREN L. MARTIN
RICHARD M. GOLDSTEIN

ATTORNEYS.

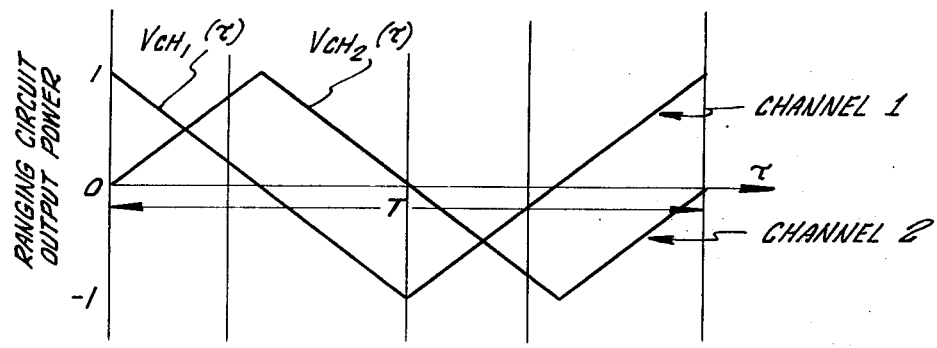
FIG_4_
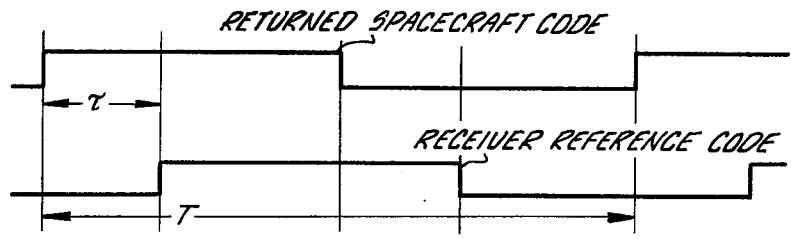
FIG_2_
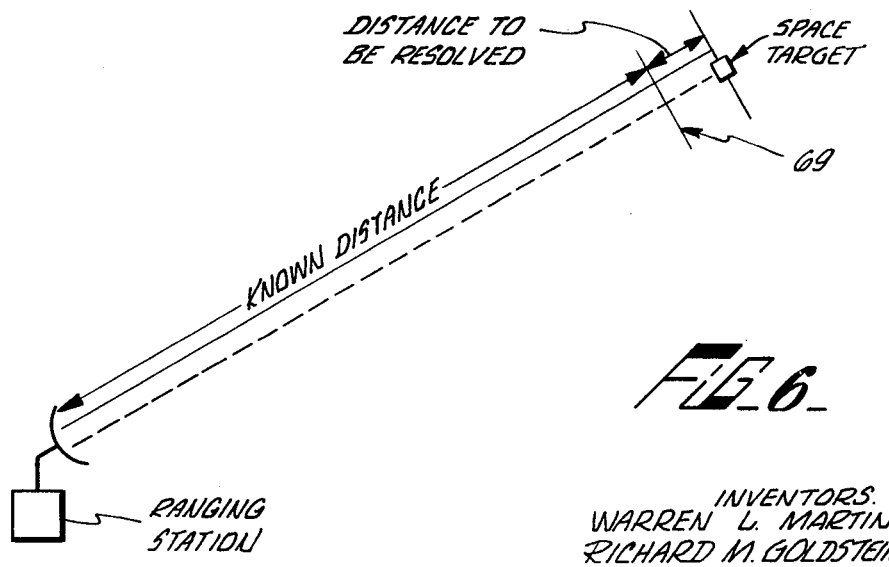
FIG_6_
INVENTORS.
WARREN L. MARTIN
RICHARD M. GOLDSTEIN
ATTORNEYS.

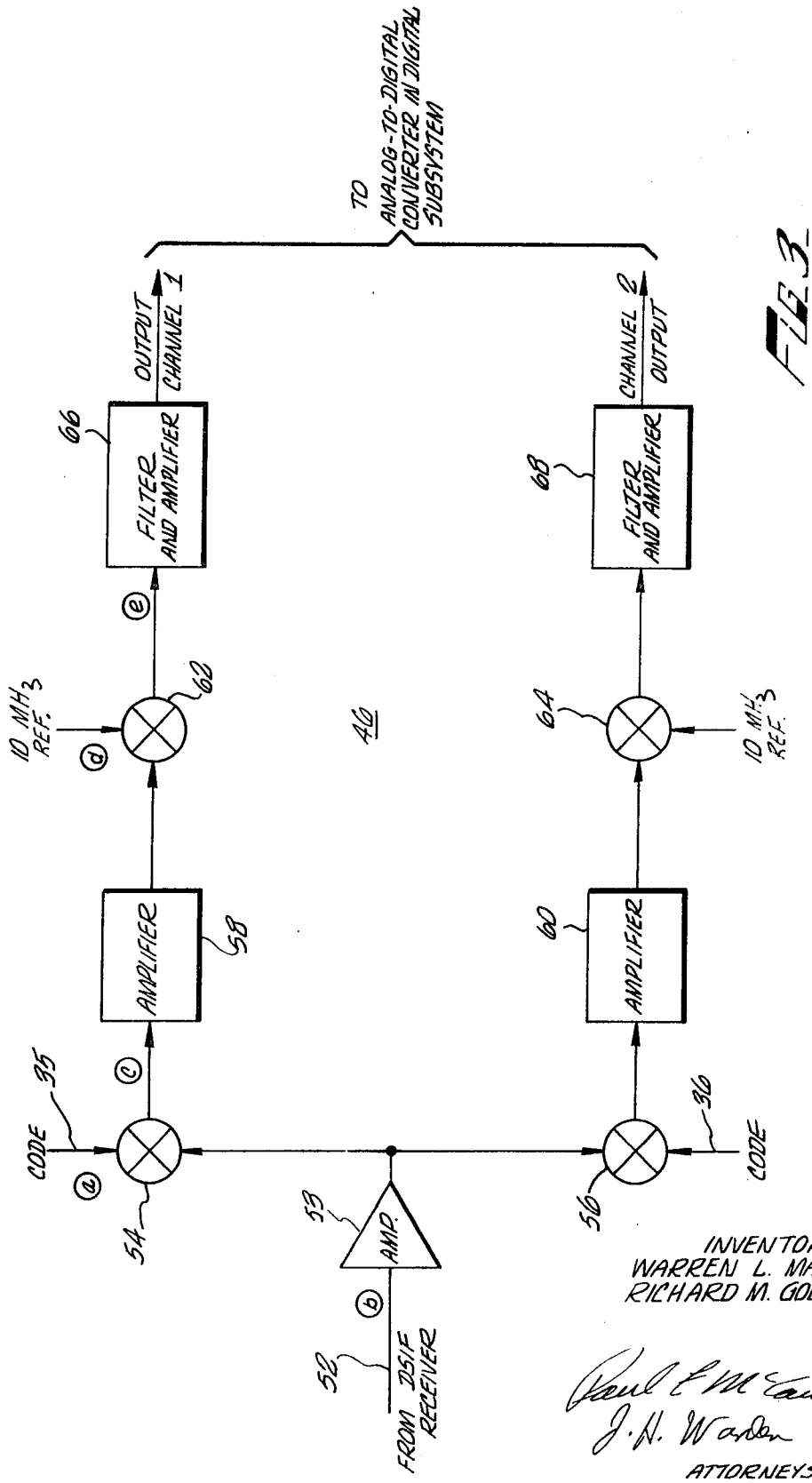

INVENTORS.
WARREN L. MARTIN
RICHARD M. GOLDSTEIN

ATTORNEYS.

BINARY CODED SEQUENTIAL ACQUISITION RANGING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention generally relates to transponder-type ranging systems for accurately determining the distance of a distant object or target. More specifically, the present invention concerns ranging systems wherein coded ranging signals or components are transmitted from a ground station to a target transponder for retransmission to the ground station, the relative phase difference between the transmitted and received coded ranging signals, at the ground station, being indicative of the target range.

2. Description of the Prior Art

Accurate measurement of the range of very distant objects, such as extraterrestrial probes, by the propagation of electromagnetic energy presents a very difficult task.

A first major difficulty is presented by the extraordinarily great distances at which such space probes are situated. These distances produce a significant attenuation of the power level of transmitted signals. As an example, the Mariner VI space probe was approximately 2AU, or 185,912,440 miles from earth and provided a typical ranging signal power level of −183 dbm at the ground receiver. Clearly, where such low power levels are involved, it is very difficult to accurately distinguish received signals from noise.

In the past, the difficulties presented by the great distances involved, and the consequent low received power levels, have been overcome, or compensated for, by the use of coding techniques wherein coded ranging signals or code components are transmitted to a distant object. Systems employing such prior art coding techniques may be conveniently classified by the method of coding that is utilized.

Systems using the first developed of these prior art coding techniques may be referred to as single component systems wherein a pseudo noise (PN) code is used. Typically, the code should have a sufficient period to allow the resolution of range ambiguities and include bits having a length that is short enough to provide the required resolution. Examples of such single component systems employing a pseudo noise code are disclosed in the U.S. Pats. to Webb, No. 3,305,636, and Couvillon, Jr., U.S. Pat. No. 3,402,265. Although workable, these single component systems have the attendant disadvantage of involving an undesirably long acquisition time, i.e., the time required to synchronize a locally generated code component with a received code component. Consequently, a second method of coding was developed in an effort to minimize the acquisition time.

Systems using this second prior art method of coding may be referred to an multi-component systems. Typically, a group of short code sequences or components are combined into a code of desired length. Such multi-component systems have been used for example in the Apollo Mark I, Mariner Venus 1967, Mariner Mars 1969, and Sidetone ranging systems.

A more detailed discussion of such multi-component systems may be obtained by reference to Technical Report No. 32–411, entitled "Optimal Ranging Codes," dated Apr. 15, 1963, by R.C. Titsworth, Jet Propulsion Laboratory, Pasadena, California. In that report, Titsworth established that the best acquisition time for a multi-component, single correlator system is achieved when each of the individual code sequences, or components to be combined, have a length $$v_t \cong n(p)^{1/2} \cong e \tag{1}$$

where $p$ is the combined code period, and $n$ is the number of code sequences or components that are to be combined. Unfortunately, a design constraint on pseudo noise coded systems demands that the individual component periods must all be relatively prime. Consequently, the optimal acquisition time is unable to be realized and the system designer is forced to trade optimality for reality and select component lengths that best accommodate both the theoretical and practical criteria. Accordingly, typical choices for the lengths of individual code sequences have been 2, 7, 11, 15, 19, 23, etc. Even with this practical compromise, substantial reductions in acquisition times have been realized over the earlier single component systems.

However, an undesirable amount of signal degradation has been experienced in the employment of multi-component systems. This signal degradation results from the sharing of the transmitted power among the plurality of combined short code sequences or components.

Another difficulty in determining the range of distant objects, such as space probes, is presented by the speed at which a space vehicle is traveling. As is well known, changes in the relative distance between two objects produces a shift or change in the frequency of a signal transmitted between the two moving objects due to the doppler effect. When it is necessary to accurately measure the phase shift of received signals, relative to a locally generated reference signal, the doppler shift frequency must be detected and compensated for. Typically, this has been accomplished by employing various closed-loop systems which serve to continually measure the doppler shift frequency and update the ranging system by providing, for example, a feedback error signal. These closed-loop systems, although serving their intended purpose, have been found to be inefficient and expensive.

The difficulties experienced in the use of prior art ranging systems are overcome by the present invention wherein signal degradation due to power sharing among simultaneously transmitted individual code sequences, or components, is compensated for by transmitting the individual components sequentially. Such sequential transmission allows maximum transmitted power to be used for each of the transmitted code components. For example, a 3 db improvement is realized over multi-component systems allocating 50 percent of the transmitted power to each of two combined components. Similarly, a 6 db gain is realized over the allocation of 25 percent of the transmitted power to each of four combined components.

Further, acquisition time may be optimized by the sequential transmission of $n$ code components each having a length 2, which is conveniently attained and which approaches the optimal length $e$. Additionally, the disadvantages attendant to closed-loop doppler compensating techniques and devices are avoided by employing an open-loop technique wherein detected doppler shift frequencies are used to doppler-compensate locally generated reference signals.

OBJECTS AND SUMMARY OF THE INVENTION

Accordingly, it is an object of the present invention to provide a binary coded sequential acquisition ranging system that enables the range of extraordinarily distant objects, such as extraterrestrial probes, to be accurately measured.

It is another object of the present invention to provide a binary coded sequential acquisition ranging system that permits full transmitted power to be employed for each of a plurality of sequentially transmitted code components.

It is a further object of the present invention to provide a multi-component ranging system that employs an open-loop mode of doppler compensation wherein received doppler shift frequencies are employed to modify locally generated code components to have bit rates matching that of code components received, at a ground station, from a distant transponder-bearing target.

It is a yet further object of the present invention to provide a multi-component ranging system that is capable of easily resolving a large number of different ranges by the simple employment of an appropriate number of selected code components.

It is a still further object of the present invention to provide a ranging system that enables the range of distant objects to be accurately determined at leisure once a ranging operation is initiated.

Briefly described, the present invention involves a technique and apparatus for determining the distance of very distant objects by sequentially transmitting a number of related code components to a target for retransmission to a ground ranging facility. The returned code components are phase compared with locally generated reference code components which have been doppler-compensated. The doppler compensation allows locally generated reference code components to be phase and frequency locked to returned components to effectively render a moving target radially motionless. The relative phase difference between the returned and the reference code components provides an accurate basis from which target range can be calculated.

More particularly, the subject binary sequential acquisition ranging system includes a transmitter for sequentially transmitting a plurality of code components to a transponder-carrying target, the range of which is to be determined. Also included is a ranging circuit which serves to generate and compare doppler-compensated reference components with returned code components.

The essential elements of the transmitter are a phase modulator and a digital coder which serve to control the modulation of a transmitted carrier frequency signal to include a series of desired code components. The ranging circuit includes a digital coder, that is a counterpart of the transmitter coder, and a pulse adder which serves to effectively doppler-compensate the receiver coder in accordance with detected doppler shift frequencies to provide reference code components. A ranging receiver is employed to detect the relative phase difference between the reference code components and code components received from the target transponder. The resulting phase information or data may subsequently be applied to a data processor to obtain a range computation.

The features that characterize the novelty of the present invention are set forth with particularity in the appended claims. Both the organization and manner of operation of the invention, as well as other objects and the attendant advantages thereof, may be best understood by reference to the following detailed description taken in conjunction with the accompanying drawings wherein like reference symbols designate like parts throughout the figures thereof.

BRIEF DESCRIPTION OF THE DRAWINGS

FIG. 2 is a graphic diagram illustrating the waveforms of an exemplary returned code component and reference code component in accordance with the present invention.

FIG. 3 is a schematic block diagram illustrating a ranging receiver that is usable with the present invention.

FIG. 4 is a graphic diagram illustrating the output signals provided by the ranging receiver shown in FIG. 3.

FIG. 6 is a schematic diagram illustrating a ground ranging station and a distant target, which is useful in discussing the resolution capability of code components.

FIG. 7 is a graphic diagram illustrating the waveform of a number of related code components that are usable in connection with the present invention.

DESCRIPTION OF THE PREFERRED EMBODIMENT

Figure 1:
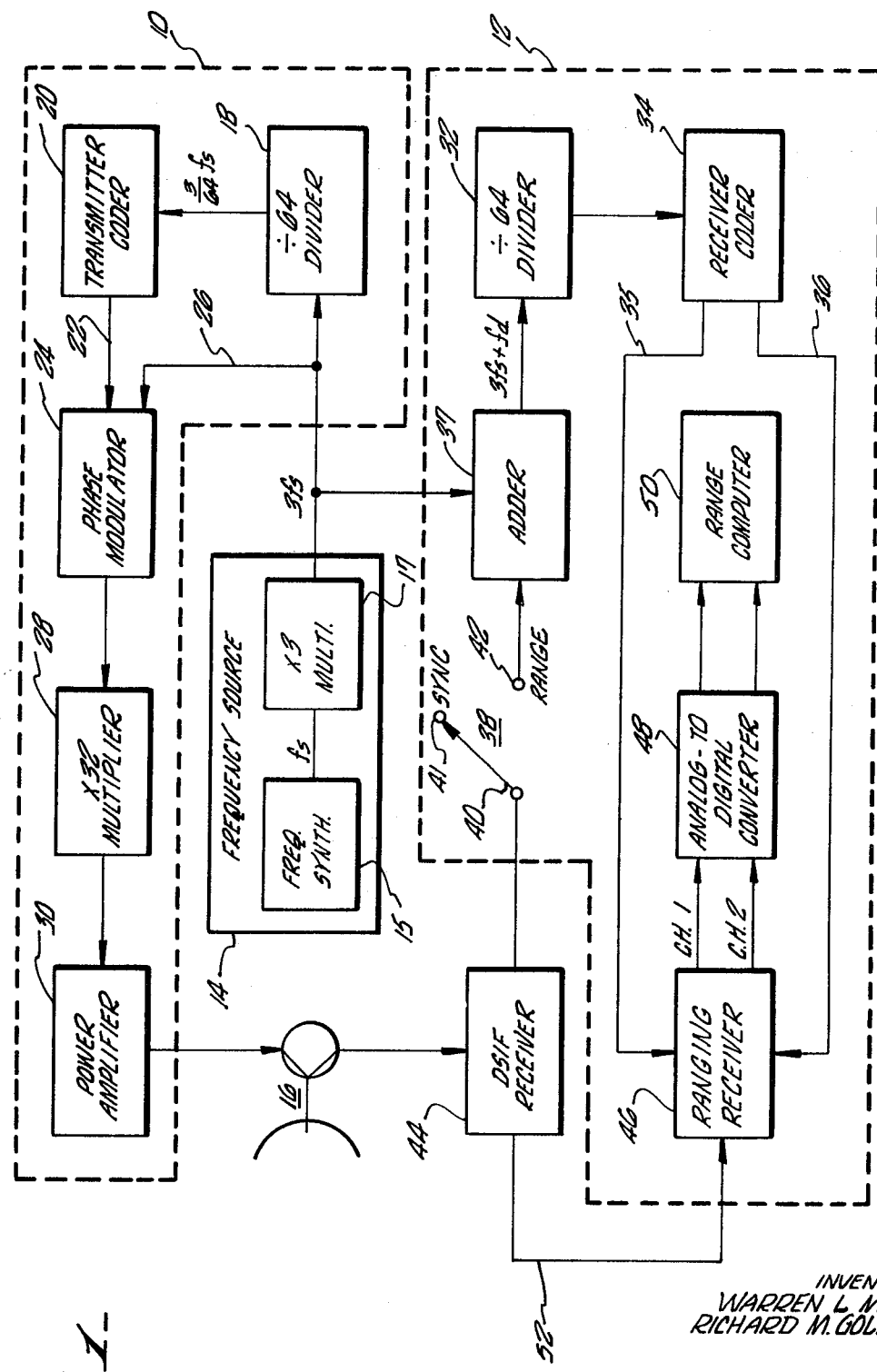
FIG. 1 is a schematic block diagram illustrating a preferred embodiment of the present invention.

Referring now to the drawings, the block diagram of FIG. 1 illustrates a binary coded, sequential acquisition ranging system in accordance with the present invention. As shown, the subject system includes a ranging transmitter 10 and a ranging circuit 12. A frequency source 14 serves to apply a preselected frequency signal $3f_s$ to both the ranging transmitter 10 and the ranging circuit 12.

Any highly stable frequency generator may be used for the frequency source 14. As an example, a conventional frequency synthesizer 15 may be used by itself, or in combination with a frequency multiplier circuit 17, to provide the preselected frequency signal $3f_s$ which may be nominally set at 66 MHz. The synthesizer 15 should have a frequency stability of at least 1 part in $10^{11}$.

The transmitter 10 functions to generate a sequence of related code components which are used to modulate a carrier signal that is transmitted to a space vehicle or probe by application to an appropriate antenna 16 of any conventional type. Specifically, these code components are generated by applying the frequency signal $3f_s$ through a frequency divider circuit 18 to a coder circuit 20. The divider circuit serves to divide the frequency of the signal $3f_s$ by 64 to provide a signal having a frequency of $(3/64)f_s$. Where $f_s$ represents a nominal frequency of 22 MHz, the divider circuit 18 serves to develop a signal having a frequency approximating 1 MHz (i.e. 1.031 MHz). The divider signal $(3/64)f_s$ is applied to the coder circuit 20 which serves to generate and provide the desired code components at a composite output lead 22. A binary counter of conventional design and having any preselected number of stages, e.g. 18, may be used for the coder circuit 20. Each of the typical outputs for the individual stages of the binary counter is represented by the composite lead 22 and is individually selectable.

Referring momentarily to FIG. 7, a limited number of code components are illustrated by the waveforms designated $C_1 - C_3$. As shown, the respective code components are related by successive components each including a train of pluses or bits that have twice the period of pulses in the preceding code component. Otherwise stated, by way of an example, the pulse repetition rate of component $C_1$ is twice the rate of component $C_2$ which in turn includes pulses having a repetition rate that is twice the rate of component $C_3$, etc.

Accordingly, the pulse period $t_n$ for pulses in the $n$th code component is given by $$t_n = 64 \times 2^n/3f_s. \qquad (2)$$

From the above equation, it may be observed that the pulse period of the code components is tied to the transmitter frequency. Changing the transmitter frequency, as may be done periodically to obtain optimum reception at the spacecraft, also changes the frequency of the coder proportionally.

Returning to FIG. 1, the code components are applied to a conventional phase modulation circuit 24 via the composite lead 22. The modulation circuit 24 serves to phase modulate the frequency signal $3f_s$ which is applied thereto over a lead 26. The resulting modulated signal is subsequently applied through an additional frequency multiplier circuit 28 which serves to raise the frequency of the phase modulated signal to a desired operational frequency. A power amplifier 30 may be employed to couple the modulated signal to the antenna apparatus 16 for transmission to a distant space probe or vehicle. Any other conventional form of modulation may be used.

The ranging circuit 12 essentially serves to phase compare returned code components with locally generated, doppler-compensated reference code components for the purpose of determining the range of a target. Portions of an exemplary returned code component accompanied by a reference code component having a phase displacement, $\tau$, are illustrated by FIG. 2. Included in the ranging circuit 12 is a frequency divider circuit 32 and a coder circuit 34 which are functionally identical to the divider circuit 18 and the coder circuit 20, respectively, included in the transmitter 10, with the exception that the receiver coder 34 is adapted to provide a pair of code components at a pair of output leads 35 and 36 wherein the code components appearing at the lead 36 are delayed by $\pi/2$. The divider circuit 32 and the coder circuit 34, operating in combination with an adder circuit 37, operate to generate the necessary doppler-compensated reference code components. This is accomplished by the adder circuit 37 operating to selectively modify the frequency of the signal applied to the divider circuit 32 to include the doppler shift frequency, properly scaled if necessary, attendant to a particular target. Accordingly, a signal having a frequency of $3f_s + (f_d)$ is applied to the divider circuit 32 where $f_d$ represents the properly scaled doppler shift frequency. Scaling of the doppler signal is discussed hereinafter. In the case of radially receding targets the doppler shift frequency will be a negative quantity and the frequency of the signal provided from the frequency source 14 will be lowered by an amount equal to $-f_d$. The converse holds true for radially approaching targets.

An appropriate switching mechanism 38, symbolically represented by a movable arm 40 and a pair of terminals 41 and 42 respectively labeled SYNC and RANGE, enables the doppler shift frequencies $f_d$ to be selectively applied to the adder circuit 37 from a standard "deep space instrumentation facility" (DSIF) receiver 44 which has been used in conjunction with earlier space probe missions. Any other conventional doppler frequency detecting apparatus, well known in the prior art, may be used to perform the function of the DSIF receiver 44. As shown, when the movable arm 40 is positioned to contact the RANGE terminal 42, doppler shift frequencies are applied to the adder circuit 37. Alternatively, movable arm 40 may be positioned to contact the SYNC terminal 41 to break the connection between the adder circuit 37 and the DSIF receiver 44. When the arm 40 is positioned in contact with the terminal 41, the basic frequency signal $3f_s$ is applied through the divider circuit 32 to the coder circuit 34. The transmitter coder circuit 20 and the receiver coder circuit 34 are then bit synchronized. This synchronization is necessary prior to commencement of a ranging operation as will become evident hereinafter.

It is thus apparent that when the switch 38 is in the SYNC position, the transmitter coder 20 and the receiver coder 34 will be operating synchronously. However, the relative radial movement of a space target with respect to the ground ranging station will produce a continuous phase shift between returned code components and the locally generated receiver code components. This phase shifting or slipping is due to the doppler frequency shift produced by the relative radial movement. As is well known, if the space target were to remain radially motionless, there would be no phase shifting or slippage but instead a constant phase difference which could be easily measured to make a range determination.

Accordingly, the present invention operates to render the space target effectively motionless by appropriately adding the detected and properly scaled doppler shift frequency to the locally generated code components. The returned code components and the doppler-compensated, locally generated, code components are thereby rendered coherent and their phase difference remains constant allowing a range measurement to be conducted at relative leisure. It is noted that the space target of course actually continues to move. Consequently, the range measurement obtained must be referenced to a particular point in time which may be designated $t_0$ and which is the instant at which the switch 38 is placed in the RANGE position by the arm 40 being placed in contact with the RANGE terminal 42.

A coherent model of the received or returned code components is thus generated within the ranging circuit 12 by modifying the frequency of the transmitted code components with the doppler shift frequencies attributable to the space target. Note that the tracking operation is open-loop and thereby eliminates any settling time and greatly simplifies hardware requirements and design.

A ranging operation is essentially performed by the combination of a ranging receiver 46, and analog-to-digital converter 48 and an appropriate range computer 50.

The ranging receiver 46 serves to phase compare the two doppler compensated reference code components, provided over the leads 35 and 36, with the returned code components applied to the ranging receiver 46 from the DSIF receiver 44 over a lead 52. FIG. 3 of the drawings illustrates a simplified block diagram of the ranging receiver 46. Assume that the returned code components are modulated on a 10 MHz DSIF carrier signal which has been modified by two-way doppler (in this case designated $f_d$). The DSIF signal is applied over a lead 52, through an amplifier 53, to a pair of identical channels which are essentially a pair of a phase comparator circuits that will each effectively produce a DC output signal that is representative of the phase difference between the compared code components. When the compared codes are in phase, the DC output signal will be at a maximum positive level and when they are 180° out of phase, the DC output signal will be at a maximum negative level. Intermediate phase differences will produce intermediate DC levels. FIG. 4 illustrates the DC output signals that will appear at outputs of the respective channels when a pair of code components are phase shifted or slipped with respect to each other at a constant rate. As shown, the DC output signals for the respective channels labeled 1 and 2 are offset by 90° as a consequence of the two reference code components provided by the receiver coder circuit 34 being similarly offset.

TABLE I hereinbelow serves to define the relationship between compared code components and the corresponding outputs of the respective channels. TABLE I may be recognized as the truth table for an exclusive NOR gate.

TABLE I

Ranging Circuit Truth Table

| Received Code From Spacecraft | Receiver Reference Coder | Ranging Receiver Output |
|---|---|---|
| 0 | 0 | +1 |
| 0 | 1 | −1 |
| 1 | 0 | −1 |
| 1 | 1 | +1 |

The two channels each respectively include a first mixer 54 and 56 which serves to mix the DSIF signal with the reference code components from the receiver coder 34. These mixers may be simple, rather inexpensive, diode switches which pass or invert the received signal depending upon whether the reference code is a binary 1 or 0. In this case the mixers 54 and 56 will pass the DSIF signal when the reference code is a binary 1 and produce a phase inversion of the DSIF signal when the code is a binary 0. Otherwise stated, when the receiver code components are in phase with the DSIF signal, the output of the mixers 54 and 56 will be a pure 10 MHz sine wave while phase displacement will produce a phase inversion of the 10 MHz sine wave. After amplification by the amplifiers 58 and 60 included in the respective channels 1 and 2, a second set of mixers 62 and 64, which are identical to the mixers 54 and 56 and to which a 10 MHz reference signal is applied, serve to remove the 10 MHz carrier frequency and effectively translate the returned signal to the desired output signal. A set of filter-amplifier circuits 66 and 68 operate to filter and amplify the output of the mixers 62 and 64 to provide the desired DC output signal which can be used for further processing.

To eliminate the effects of DC drift or changes in amplification between the two channels, the code inputs provided over the leads 35 and 36 may be periodically interchanged at preselected time intervals, e.g. 1 second.

Figure 5:
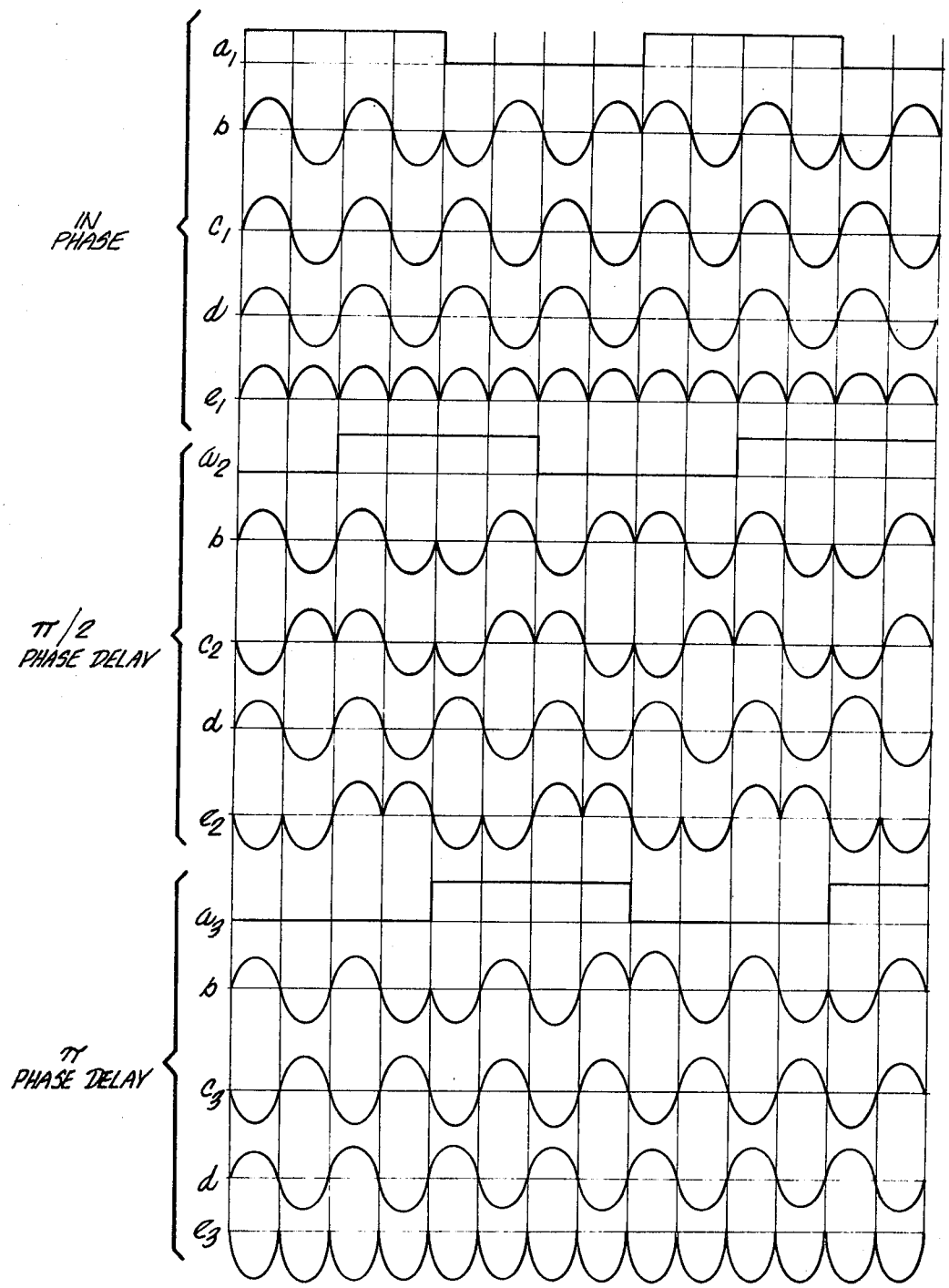
FIG. 5 is a graphic diagram illustrating the waveform of a number of signals that are useful in describing the operation of the ranging receiver illustrated in FIG. 3.
Figure 1:
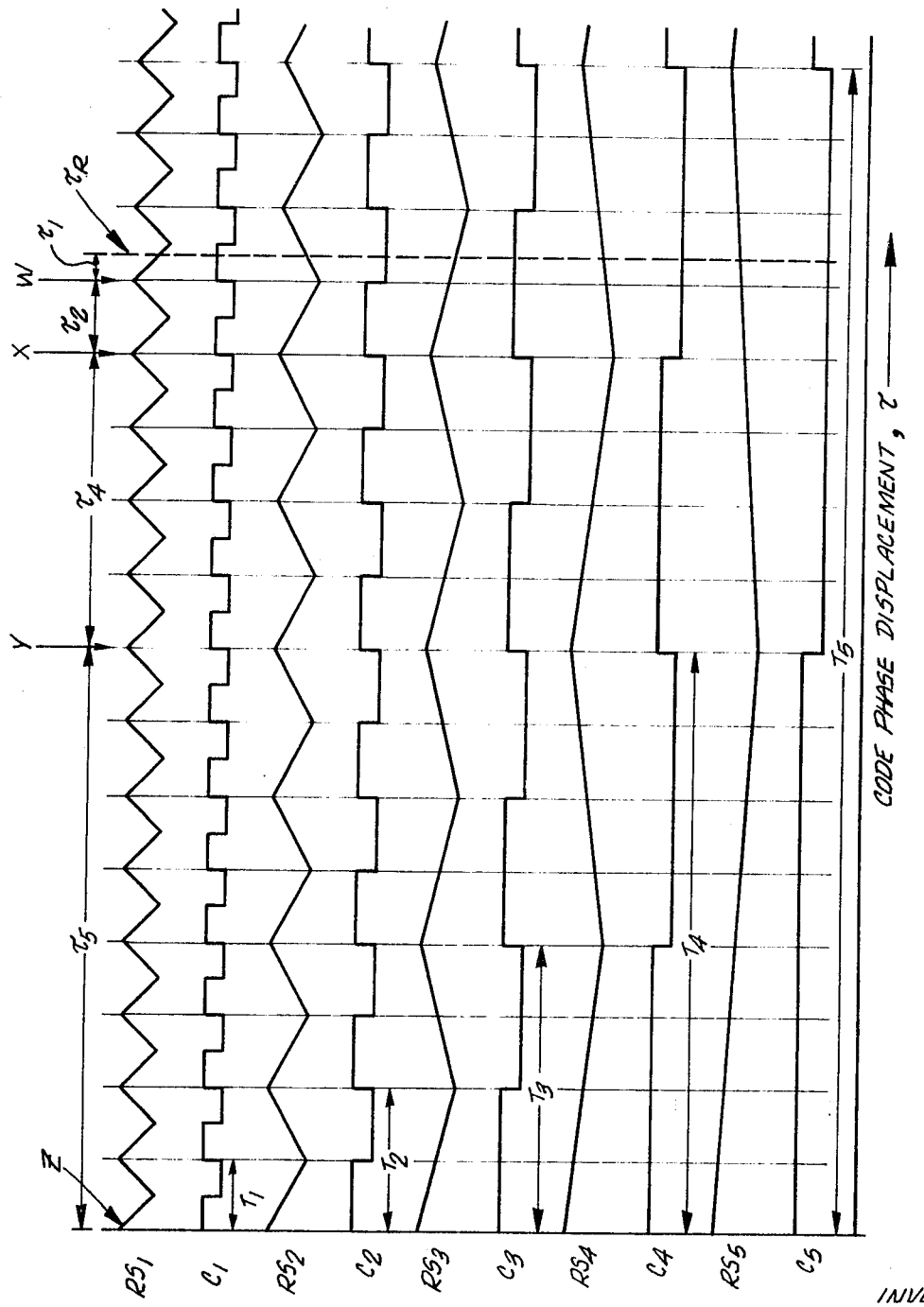

Referring now to FIG. 5 in conjunction with FIG. 3, the illustrated waveforms are designated by the letters $a$, $b$, $c$, etc. These letters also appear on FIG. 3, without the subscripts, to indicate the points in the ranging receiver 46 to which the respective waveforms correspond. Generally considered, the waveforms of FIG. 5 serve to illustrate the actual operation of the ranging receiver 46 for each of three separate phase comparisons which are, an in-phase situation, a 90° phase difference, and a 180° phase difference between the returned and reference code components.

As shown, by the waveforms $b$, the DSIF signal is simply illustrated as a sinusoidal waveform having periodic phase changes corresponding to the transmitted code components which are the same as the reference code components and illustrated by the pulsed waveforms $a_1$, $a_2$ and $a_3$. It is to be noted that the phase modulation angles illustrated by waveforms $b$ of FIG. 5 are intended to be exemplary and that, in practice, any desired modulation angle may be used, i.e., 1° to 89°. The use of 90° modulation angles has been found to make the detection of doppler frequencies an impossible task.

As earlier explained, a binary 1 code component allows the DSIF signal to pass through the mixer 54 while a binary 0 produces a phase change. The output of the mixer 54 would thus appear as the waveforms $c_1$, $c_2$ and $c_3$ for the respective exemplary cases. Application of the 10 MHz reference signal, illustrated by waveforms $d$, to the mixer 62 produces a similar result as shown by the respective waveforms $e_1$, $e_2$ and $e_3$ which illustrate the resulting output signals. It may be observed from the drawing that the waveform $e_1$ would be averaged out to a maximum positive level (+1) output signal corresponding to an in-phase condition. Similarly, the waveform $e_2$ would average out to a zero level output signal corresponding to a 90° out-of-phase condition while the waveform $e_3$ would average out to a maximum negative level (−1) output signal for the 180° out-of-phase condition. It should be recognized that the zero level output signal of waveform $e_2$ will also occur for a 270° out-of-phase condition. This, however, is easily resolved in the manner discussed hereinafter.

Two ranging circuit channels are required to measure the phase difference between received code components and the reference code components generated by the receiver coder 34. Otherwise stated, the two channels are required to accurately determine the amplitude of the output signals at the respective channels 1 and 2, the amplitude representing the phase difference, $\tau$. The method employed in conjunction with the present invention is analogous to the optimum phase estimator for sine wave signals. FIG. 4 illustrates the time dependence of the channel 1 and channel 2 outputs, $V_{CH1}$ and $V_{CH2}$, respectively, to phase difference $\tau$. It may be easily shown that $$\tau = \frac{|V_{CH2}|}{|V_{CH1}|+|V_{CH2}|}\left(\frac{T}{4}\right) \quad (3)$$

where $T$ is the period of a code pulse and the values of $V_{CH1}$ and $V_{CH2}$ are assumed to be in the first quadrant. Operationally, both of the channels 1 and 2 may be sampled periodically, e.g. 10 millisecond intervals, and the results, $V_n$, summed over some integration time, $t_i$. After sufficient samples have been accumulated, the phase displacement, $\tau$, can be computed by using the exemplary relationships included in TABLE II hereinbelow which are based on the above equation (3) and wherein each of the equations apply to one of the four quadrants. It is to be noted that any other means of calculation can be employed.

TABLE II.—PHASE ANGLE CALCULATION

| Phase displacement | Quadrant |
|---|---|
| $\tau = \left[\dfrac{\left|\sum_{t=0}^{t_i} V_{CH2}\right|}{\left|\sum_{t=0}^{t_i} V_{CH1}\right|+\left|\sum_{t=0}^{t_i} V_{CH2}\right|}\right]\dfrac{T}{4}$ | I $\quad 0<\tau<\dfrac{\pi}{2}$ |
| $\tau = \left[2-\dfrac{\left|\sum_{t=0}^{t_i} V_{CH2}\right|}{\left|\sum_{t=0}^{t_i} V_{CH1}\right|+\left|\sum_{t=0}^{t_i} V_{CH2}\right|}\right]\dfrac{T}{4}$ | II $\quad \dfrac{\pi}{2}<\tau<\pi$ |
| $\tau = \left[2+\dfrac{\left|\sum_{t=0}^{t_i} V_{CH2}\right|}{\left|\sum_{t=0}^{t_i} V_{CH1}\right|+\left|\sum_{t=0}^{t_i} V_{CH2}\right|}\right]\dfrac{T}{4}$ | III $\quad \pi<\tau<\dfrac{3\pi}{2}$ |
| $\tau = \left[4-\dfrac{\left|\sum_{t=0}^{t_i} V_{CH2}\right|}{\left|\sum_{t=0}^{t_i} V_{CH1}\right|+\left|\sum_{t=0}^{t_i} V_{CH2}\right|}\right]\dfrac{T}{4}$ | IV $\quad \dfrac{3\pi}{2}<\tau<2\pi$ |

As earlier mentioned, 18 related code components have been designed into the system of the present invention by employing 18-stage binary counters for the coder circuits 20 and 34, the lowest frequency code component having a period in excess of 0.25 seconds using the indicated frequencies. It is to be understood that any other number of components may be employed.

It is not necessary to employ all 18 code components, but rather, it is only necessary to use the lowest code component necessary to resolve the range uncertainty. For example, with reference to FIG. 6, if the range is known to be within 1 millisecond (150 kilometers), only the first 10 components need be used. TABLE III hereinbelow provides exemplary data, in tabular form, for the resolving capabilities of the various components where the indicated basic operating frequency of $f_s =$ 22MHz is provided by the frequency synthesizer 15.

TABLE III

Code Range Resolving Power

| Comp. $C_n$ | Approx. Period $t_n$ ($\mu$ sec.) | Approx. Ambiquity Resolving Power (km.) |
|---|---|---|
| 1 | 1.94 | 2.85×10⁻¹ |
| 2 | 3.88 | 5.70×10⁻¹ |
| 3 | 7.76 | 1.14 |
| 4 | 1.55×10¹ | 2.28 |
| 5 | 3.10×10¹ | 4.56 |
| 6 | 6.21×10¹ | |
| 7 | 1.24×10² | 1.82×10¹ |
| 8 | 2.48×10² | 3.65×10¹ |
| 9 | 4.97×10² | 7.29×10¹ |
| 10 | 9.93×10² | 1.46×10² |
| 11 | 1.99×10³ | 2.92×10² |
| 12 | 3.97×10³ | 5.83×10² |
| 13 | 7.94×10³ | 1.17×10³ |
| 14 | 1.59×10⁴ | 2.33×10³ |
| 15 | 3.18×10⁴ | 4.67×10³ |
| 16 | 6.36×10⁴ | 9.33×10³ |
| 17 | 1.27×10⁵ | 1.87×10⁴ |
| 18 | 2.54×10⁵ | 3.73×10⁴ |

It has been suggested that a 3 db improvement in system performance can be obtained by shifting the receiver reference code components to have $\tau = K(T/4)$ where $K = 1, 2, 3, \ldots, N$ (See JPL Space Programs Summary 37–52, Vol. II, pp 46–49). As a practical matter, it has been found that this may be accomplished by moving to a peak, or maximum value, on the correlation function (ranging receiver output signal). Further, adopting the constraint that the code component having the highest frequency (pulse repetition rate) always be shifted to make $\tau_1 = 0$ guarantees that the next lower code component will always be at a peak or maximum value (positive or negative), where $\tau_1$ is the measured phase difference for the highest frequency code component, i.e., $C_1$.

This procedure can be best understood by reference to the waveforms illustrated by FIG. 7 which shows the code correlation characteristics of the first five code components. Suppose that the range to a target results in a $\tau = \tau_R$. Suppose further that the range uncertainty, $\hat{R}$, of the space target is in the time interval $$T_4 < \hat{R} < T_5. \qquad (4)$$

MEASUREMENT of the ranging receiver output signal, $RS_1$, will indicate that the correlation amplitude is not at its peak value (i.e., $\tau_1 \neq 0$), and that a phase shift of the receiver coder 34 is necessary to obtain a maximum positive peak. For simplicity of design, the shifting may be simply accomplished by deleting coder drive pulses, from the divider circuit 32, in effect delaying the receiver coder 34. This is equivalent to reducing the space target range and, of course, the value of $\tau$. Otherwise stated, with reference to FIG. 6, the space target is effectively brought towards the point 69 at which the range becomes known. The distance through which the target must be effectively moved is added to the known range to give a complete range measurement. The highest frequency code component $C_1$ is shifted, using the exemplary parameters, by dropping 66 MHz cycles, resulting in a phase displacement of approximately 15 nanoseconds per cycle. A total of 128 shifts would be required to shift, or slip, the phase by one full cycle.

After calculating the requisite number of shifts, for example, by operation of the computer 50 (FIG. 1), the receiver coder 34 is delayed to bring the correlation value to the first positive peak, point W (FIG. 7) of waveforms $RS_1$ to thereby make $\tau_1 = 0$. All code components of lower frequency are at the same time delayed by an equal amount. As earlier explained and from FIG. 7, it is clear that the code component $C_2$ must now be at a peak, either positive or negative. Thus when correlating with $C_2$, it is sufficient to determine the sign of the output signal $RS_2$ without regard to magnitude. In the instant example, $RS_2$ is at a negative peak, along the line corresponding to point W, and a shift of $T_2/2$ is necessary to reduce $\tau_2$ to 0. This is accomplished by delaying the code component $C_2$ by one half cycle, along with all lower order code components, until the point X is reached. Examination of $RS_3$ reveals that it is already at a positive peak and no shift of code component $C_3$ is required. The procedure is repeated for output signal $RS_4$ and code component $C_4$ to reach the point Y and again repeated for output signal $RS_5$ and code component $C_5$ to produce the final delay of code component $C_5$ to reach the point Z. The total number of shifts necessary to reach point Z is a direct measure of the phase delay, $\tau_R$, between the returned and reference code components, and hence the range.

Referring once again to FIG. 1, the analog-to-digital converter 48 serves to convert the ranging output signals, available at channels 1 and 2, to a digital format suitable for use by the computer 50 which serves to perform the desired range calculation. Although any computer properly programmed would be suitable, Scientific Data Systems series 920 computers, which are already installed at most major U.S. tracking stations, have been used to perform a ranging operation, in accordance with the present invention.

Programming inputs include the integration times for the first and other code components to be used, and the time at which transmission of the first code component is commenced. A round-trip time-of-flight estimate for the transmitted signals is also required. The computer may then be employed to calculate a set of critical times which are stored and constantly scanned during a ranging operation. The times, for example, specify the beginning and ending of each code component transmission and the times during which individual components should be available at the receiver for correlation. When critical times are reached, appropriate commands are sent to the ranging system to instigate the proper action. A guard band of 1–2 seconds may be left between critical times to allow for an uncertainty in the time-of-flight.

Having considered the component parts of the present invention in detail, a typical ranging operation is now described.

Assuming that the range of a space target is $1.5 \times 10^6$ kilometers $\pm 100$ km and the objective is to refine a range measurement to $\pm 15$ meters. Assume also that the integration time required for the first or highest frequency code component is $t_i = 125$ seconds and that the acquisition time for the remaining nine code components which must be employed totals 800 seconds or 88.8 seconds each. These numbers, along with an expected signal-to-noise ratio, and error probability figure, and a starting time are entered into the computer which then calculates the critical time table that was earlier mentioned.

The computer may be programmed to remain in a wait phase until the first critical time is reached at which point transmission of the first code component commences for a precalculated period of time. Since the round-trip time of flight will require 10 minutes, the first six code components, e.g. $C_1$–$C_6$, along with a portion of the seventh code component, $C_7$, can be transmitted before code component $C_1$ returns from the space target. Just after its arrival the computer operates to disable the doppler compensating mechanism (switch 38, FIG. 1), commands the receiver coder circuit 34 to generate a reference code component $C_1$, and synchronizes the receiver coder 34 and the divider circuit 32 with their counterparts in the transmitter, i.e., transmitter coder 20 and divider circuit 18. After synchronization, the switch 38 is closed to the range position by positioning the arm 40 to contact the RANGE terminal 42 and the time, $t_0$, noted. The ensuing range measurement is valid for this time $t_0$ in that it marks the instant at which the relationship between doppler-compensated, locally generated, reference code components and returned code components become fixed.

The computer may be programmed to sample both of the channels 1 and 2, of the ranging receiver 46, at 10 millisecond intervals. It then calculates the phase displacement $\tau_1$ and shifts the reference code component $C_1$ to reach a positive peak on the correlation curve. The procedure is then repeated for each of the lower frequency components until all have been completed and the final value of $\tau_R$ is computed to establish a range measurement.

After all code components have been acquired it may be desired to return to the first code component $C_1$ to further refine the range measurement. It is again noted that since the reference and returned code components are fixed upon closure of the switch 38 to the RANGE position at the time $t_0$, the range measurement may be made at relative leisure for the purpose of determining a single range measurement which would be valid for the time $t_0$. To obtain additional range measurements, the acquisition procedure must be repeated.

It is noted that the ranging system of the present invention must be compatible with existing spacecraft transponders. For example, typical turn-around transponders detect and remove ranging modulation from received carrier signals which are then multiplied in frequency by a predetermined factor, i.e., 240/221. The new carrier signal is remodulated with previously detected code components and retransmitted to the ground station. As may be easily appreciated by those persons having ordinary skill in the art, whenever the space target transponder translates the carrier frequency, or the code component frequency, but not both, such frequency translation must be compensated for before doppler-compensated, coherent model code components can be generated. Accordingly, a "doppler scaler" circuit may be connected to the DSIF receiver 44 to compensate for the frequency translation by multiplying doppler signals by a factor, e.g. 221/240, which is the inverse of the transponder multiplication factor. The scaler circuit may also be used to make the doppler signals compatible with the operating frequency of the adder circuit 37, whenever necessary.

Since present transponders generally have a bandwidth in the neighborhood of 3.5 MHz, the high frequency code component must have a bit period of at least 1 microsecond. The reason for the use of the exemplary parameters is thus able to be appreciated. Notably, other parameters may be used in accordance with the present invention where changes are made in the bandwidth of available transponders.

It is now clear that the present invention overcomes prior art signal degradation difficulties, that have been experienced due to power sharing among simultaneously transmitted individual code sequences, by transmitting the individual code components sequentially such that maximum transmitted power is available for each of the transmitted code components. Further, the disadvantages attendant to closed-loop doppler compensating techniques are avoided by the present invention by the employment of an open-loop technique wherein detected doppler shift frequencies are used to doppler compensate locally generated reference code components. Moreover, it has been found that the present invention enables the range of very distant space targets to now be more accurately determined than heretofore possible.

What is claimed is:

1. A ranging system of the type wherein binary coded components are sequentially transmitted to a transponder-bearing space target for the purpose of resolving the range of said space target with respect to said ranging system which comprises:

a ranging transmitter including:
first coder means for generating a plurality of related first binary code components, and
means for transmitting ranging signals including said binary code components to said space target for retransmission to said ranging system;

means for receiving retransmitted ranging signals, including received binary code components, and adapted to provide in response thereto a doppler frequency signal and a modulated carrier signal;

a ranging circuit including:
second coder means for generating a plurality of related second binary code components that are identical to said first binary code components generated by said first coder means, and which are provided on a first output lead and a quadrature output lead,
means responsive to said doppler frequency signal, for controlling said second coder means to generate modified second binary code components which are identical to said received binary code components, and
ranging receiver means for comparing the phases of said modified second binary code components with said received binary code components and providing a pair of analog signals having an amplitude representative of the phase difference between said received binary code components and each of said modified second binary code components, said ranging receiver means including a pair of phase comparison channels for receiving one of said modified binary code components, each of said phase comparison channels having demodulation mixer means for demodulating said modulated carrier signal, and means operatively coupled to said demodulation mixer means for providing one of said analog phase signals; and utilization means operatively coupled to receive said analog phase signals for determining the range of said space target, wherein the phase delay between said received binary code components and said second binary code components is representative of a distance to said space target in excess of a first known distance but less than an additional known distance beyond said first known distance.

2. The apparatus defined by claim 1 further including a frequency source for applying an alternating current signal having a stable frequency to said first coder means and said second coder means.

3. The apparatus defined by claim 2 wherein said first and second coder means each comprise a binary counter having a plurality of stages each having an individually selectable output lead, said counter operating to provide a different code component in the form of a square wave output signal at each of said output leads in response to alternating current signals applied to said counter, the frequency of successive ones of said square wave signals being reduced by a factor of two.

4. The apparatus defined by claim 3 wherein said means responsive to said doppler signal comprises an adder circuit for varying the frequency of said alternating current signals applied to said second coder means in accordance with said doppler frequency signals.

5. The apparatus defined by claim 4 wherein said utilization means comprises:
means for converting said analog signals to digital signals; and
means, operatively coupled to receive said digital signals, for determining the phase delay between said received binary code components and said second binary code components.

6. The apparatus defined by claim 5 wherein the number of binary code components sequentially transmitted to said transponder-bearing space target and retransmitted therefrom is selected such that the cyclic period of only the lowest frequency binary code component exceeds said additional known distance, said analog signals having a maximum positive amplitude level when said received and second binary code components are in phase and having a maximum negative amplitude level when said received and second binary code components are 180° out-of-phase, and wherein said phase delay is determined by a process including the steps of:

measuring the phase difference between the received and second binary code components having the highest frequency;

shifting all second binary code components by an amount equal to the measured phase difference between the received and second binary code components having the highest frequency such that said measured phase difference is reduced to zero and the analog signal corresponding to the highest frequency second binary code component is at a maximum positive amplitude level;

sequentially shifting successively lower frequency second binary code components, along with all other lower frequency second binary code components, by an amount necessary to have the analog signals corresponding to said lower frequency second binary code components sequentially brought to a maximum positive amplitude level; and determining the total amount of shift required to have the analog signals, corresponding to all second binary code components, brought to a maximum positive amplitude level, said total amount being a measure of said phase delay.

7. In a ranging system adapted to resolve the range of a distant space target which is further than a first known distance but no further than an additional known distance, the ranging system including a transmitter for generating and sequentially transmitting a plurality of binary code components, each successively having a frequency that is decreased by a factor of two, to a transponder-bearing space target, a ground receiver for receiving code components retransmitted from said space target and adapted to provide a doppler signal representative of any doppler frequency shift in the frequency of received code components, the improvement comprising:

a ranging circuit including:
component means, coupled to receive said doppler frequency signal, for providing, at a pair of quadrature terminals, a plurality of model code components having a frequency identical to said received code components, and
ranging receiver means, coupled to said quadrature channels and to said ground receiver, for developing a pair of analog signals respectively having an amplitude representative of the phase difference between said received code components and said model code components, said ranging receiver means including a pair of phase comparison channels, each channel having first mixer means for mixing the model code components provided over one of said quadrature terminals with said received code components, second mixer means operatively coupled to said first mixer means for developing one of said analog signals, and means for filtering said analog signals; and utilization means adapted to receive said analog signals, for resolving the phase delay between said received code components and said model code components, said phase delay representing the distance beyond said known distance to said space target.

8. The apparatus defined by claim 7, said system further including a source of frequency signals for applying said frequency signals to said transmitter and to said component means, said component means including:

a binary counter having a plurality of stages each coupled to an individually selectable output lead, a plurality of model code components being provided at respective ones of said output leads, successive model code components having the frequency thereof reduced by a factor of two;

an adder circuit coupled to receive said frequency signals and selectively receive said doppler signals for selectively providing either said frequency signals or the sum of said frequency signals and said doppler signals at an output thereof;

switching means for selectively applying said doppler signals to said adder circuit; and divider means for applying output signals from said adder means to said binary counter, said adder output signals being reduced in frequency by a preselected factor wherein the model code components provided by said binary counter will be identical to received code components whenever said adder output signal represents the sum of said frequency signals and said doppler signals.

9. The apparatus defined by claim 7 wherein said utilization means comprises:

converter means for converting said analog signals to digital signals; and computing means, coupled to receive said digital signals, for determining the phase delay between said received code components and said model code components.

10. The apparatus defined by claim 9, said system further including a source of frequency signals for applying said frequency signals to said transmitter and to said component means, said component means including:

a binary counter having a plurality of stages each coupled to an individually selectable output lead, a plurality of model code components being provided at respective ones of said output leads, successive model code components having the frequency thereof reduced by a factor of two;

an adder circuit coupled to receive said frequency signals and selectively receive said doppler signals for selectively providing either said frequency signals or the sum of said frequency signals and said doppler signals at an output thereof;

switching means for selectively applying said doppler signals to said adder circuit; and divider means for applying output signals from said adder means to said binary counter, said adder output signals being reduced in frequency by a preselected factor wherein the model code components provided by said binary counter will be identical to received code components whenever said adder output signal represents the sum of said frequency signals and said doppler signals.

11. The apparatus defined by claim 9 wherein said analog signals have a maximum positive amplitude level when said model and received code components are in phase and have a maximum negative amplitude level when said model and received code components are 180° out of phase, and wherein said phase delay is determined by a process including the steps of:

measuring the phase difference between the received and model code components having the highest frequency;

shifting all model code components by an amount equal to the measured phase difference between the received and model code components having the highest frequency such that said measured phase difference is reduced to zero and the analog signal corresponding to the highest frequency model code component is at a maximum positive amplitude level;

sequentially shifting successively lower frequency model code components, along with all other lower frequency model code components, by an amount necessary to have the analog signals corresponding to said lower frequency model code components sequentially brought to a maximum positive amplitude level; and determining the total amount of shift required to have the analog signals, corresponding to all model code components, brought to a maximum positive amplitude level, said total amount being a measure of said phase delay.

* * * * *